(12) United States Patent
Teng et al.

(10) Patent No.: US 12,057,948 B2
(45) Date of Patent: Aug. 6, 2024

(54) POWER SUPPLY SYSTEM AND METHOD HAVING POWER MANAGEMENT MECHANISM

(71) Applicant: REALTEK SEMICONDUCTOR CORPORATION, Hsinchu (TW)

(72) Inventors: Peng-Chao Teng, Suzhou (CN); Ming-Cai Xu, Suzhou (CN); Jia-Ming Shen, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/385,027

(22) Filed: Jul. 26, 2021

(65) Prior Publication Data
US 2022/0209973 A1    Jun. 30, 2022

(30) Foreign Application Priority Data

Dec. 25, 2020    (CN) .......................... 202011559577.8

(51) Int. Cl.
*G06F 1/26*    (2006.01)
*G06F 1/28*    (2006.01)
(Continued)

(52) U.S. Cl.
CPC .............. *H04L 12/10* (2013.01); *G06F 1/266* (2013.01); *G06F 1/28* (2013.01); *H04L 12/40045* (2013.01)

(58) Field of Classification Search
None
See application file for complete search history.

(56) References Cited

U.S. PATENT DOCUMENTS 8,301,913 B2    10/2012    Diab et al.
8,352,754 B2    1/2013    Chin
(Continued)

FOREIGN PATENT DOCUMENTS

CN    105812147 A    7/2016
CN    107994999 A    5/2018
(Continued)

OTHER PUBLICATIONS

Translation of the WIPO publication WO2021147509 (Year: 2021).*

*Primary Examiner* — Fahmida Rahman
(74) *Attorney, Agent, or Firm* — WPAT, P.C.

(57) ABSTRACT

The present invention discloses a power supply method having power management mechanism that includes the steps outlined below. Power request information of power requesting devices is retrieved to generate a to-be-powered device list and a requested power. Whether a current requesting device satisfy a power stable criteria and a power sufficient criteria is determined, The power stable criteria is satisfied when the power requesting devices each having a priority higher than that of the current requesting device all operate in a powered mode or when the power requesting devices that operate in the powered mode enter a stable operation status. The power sufficient criteria is satisfied when a stable system remained power of a power supply system is not smaller than an individual requested power of the current requesting device. When the criteria are satisfied, the current requesting device is operated in the powered mode to update the requested power.

15 Claims, 4 Drawing Sheets

(51) Int. Cl.
 H04L 12/10 (2006.01)
 H04L 12/40 (2006.01)

(56) References Cited

U.S. PATENT DOCUMENTS

| | | | | |
|---|---|---|---|---|
| 2009/0140574 | A1* | 6/2009 | Gorman | H02J 1/14 |
| | | | | 700/297 |
| 2015/0127957 | A1* | 5/2015 | Sethi | G06F 1/26 |
| | | | | 713/300 |
| 2018/0196490 | A1* | 7/2018 | Ail | G06F 1/3287 |
| 2018/0342905 | A1* | 11/2018 | Fukaya | H02J 50/20 |
| 2020/0076628 | A1* | 3/2020 | Yam | G06F 1/28 |

FOREIGN PATENT DOCUMENTS

| | | | | |
|---|---|---|---|---|
| CN | 109193653 | | 1/2019 | |
| WO | WO-2021147509 A1 | * | 7/2021 | ......... G01R 19/0007 |

* cited by examiner

POWER SUPPLY SYSTEM AND METHOD HAVING POWER MANAGEMENT MECHANISM

BACKGROUND OF THE INVENTION

1. Field of the Invention

The present invention relates to a power supply system and a power supply method having power management mechanism.

2. Description of Related Art

Power over Ethernet (PoE) technology allows not only data signal, but also direct current power to be transmitted between devices. Besides high compatibility of the wiring, the advantages of such a technology also include low power supplying cost, wide support of powered devices and easy power supplying management.

In the power supply system implemented by the technology described above, a common power management method is to determine an order to supply the power to the powered device according to a priority of each of the powered devices and determine an order to remove the powered device according to the priority when the power is not enough. However, such a method is not able to efficiently make use of the resource. An elastic power management can not be accomplished.

SUMMARY OF THE INVENTION

In consideration of the problem of the prior art, an object of the present invention is to provide a power supply system and a power supply method having power management mechanism.

The present invention discloses a power supply method having power management mechanism used in a power supply system that includes the steps outlined below. Power request information of each of a plurality of power requesting devices coupled to a power supplying equipment is retrieved to generate a to-be-powered device list and a requested power. One of the power requesting devices operated in a power-requesting mode is selected as a current requesting device. Whether the current requesting device simultaneously satisfies a power stable criteria and a power sufficient criteria is determined, wherein the current requesting device is determined to satisfy the power stable criteria when each of the power requesting devices having a priority higher than the priority of the current requesting device operates in a powered mode or when all the power requesting devices that operate in the powered mode enter a stable operation status, and the current requesting device is determined to satisfy the power sufficient criteria when a stable system remained power of the power supply system is not smaller than an individual requested power of the current requesting device. The current requesting device is operated in the powered mode when both of the criteria are satisfied such that the power supplying equipment supplies power to the current requesting device. The current requesting device is removed from the to-be-powered device list and the requested power is updated.

The present invention also discloses a power supply system having power management mechanism that includes a power supplying equipment, a memory and a processing circuit. The memory is configured to store computer executable commands The processing circuit is electrically coupled to the power supplying equipment and the memory and configured to retrieve the computer executable commands from the memory to execute a power supply method that includes the steps outlined below. Power request information of each of a plurality of power requesting devices coupled to a power supplying equipment is retrieved to generate a to-be-powered device list and a requested power. One of the power requesting devices operated in a power-requesting mode is selected as a current requesting device. Whether the current requesting device simultaneously satisfies a power stable criteria and a power sufficient criteria is determined, wherein the current requesting device is determined to satisfy the power stable criteria when each of the power requesting devices having a priority higher than the priority of the current requesting device operates in a powered mode or when all the power requesting devices that operate in the powered mode enter a stable operation status, and the current requesting device is determined to satisfy the power sufficient criteria when a stable system remained power of the power supply system is not smaller than an individual requested power of the current requesting device. The current requesting device is operated in the powered mode when both of the criteria are satisfied such that the power supplying equipment supplies power to the current requesting device. The current requesting device is removed from the to-be-powered device list and the requested power is updated.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a power supply system and a power supply method having power management mechanism to perform elastic power management and determine the assignment of the resource not totally based on the priority of the power requesting devices.

Figure 1:
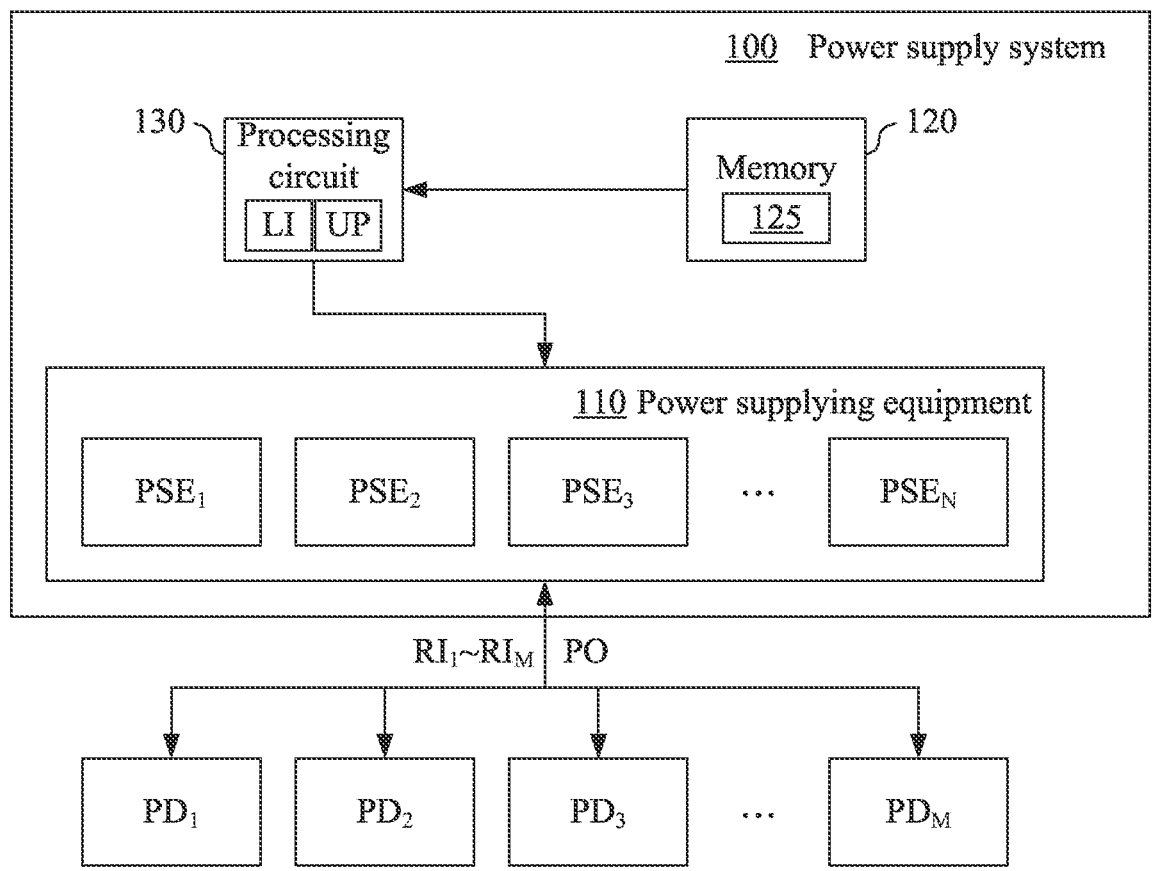
FIG. 1 illustrates a diagram of a power supply system having power management mechanism according to an embodiment of the present invention.

Reference is now made to FIG. 1. FIG. 1 illustrates a diagram of a power supply system 100 having power management mechanism according to an embodiment of the present invention. The power supply system 100 includes a power supplying equipment 110, a memory 120 and a processing circuit 130.

The power supplying equipment 110 includes at least one power supply unit, in which N power supply units $PSE_1 \sim PSE_N$ are exemplarily illustrated in FIG. 1, wherein N is a positive integer larger than or equal to 1. The power supplying equipment 110 allows at least one power requesting device to be coupled thereto, in which M power requesting devices $PD_1 \sim PD_M$ are exemplarily illustrated in FIG. 1, wherein M is a positive integer larger than or equal to 1. In an embodiment, the power supplying equipment 110 and the power requesting devices $PD_1 \sim PD_M$ transmit power according to such as, but not limited to Power over Ethernet (PoE) technology, such that the power supply units $PSE_1 \sim PSE_N$ supply power PO to the power requesting devices $PD_1 \sim PD_M$. At least a part of the power requesting devices $PD_1 \sim PD_M$ operate according to the power PO.

In different embodiments, the memory 120 and the processing circuit 130 can be disposed in the power supplying equipment 110 or outside of the power supplying equipment 110. The present invention is not limited thereto.

The memory 120 can be any storage device configured to store data, such as but not limited to a random access memory (RAM), a read only memory (ROM) or a hard disk. It is appreciated that in different embodiments, the memory 120 may include only one of the storage devices described above or include a plurality of the storage devices described above to store different types of data. In an embodiment, memory 120 is configured to store computer executable commands 125.

The processing circuit 130 is electrically coupled to the power supplying equipment 110 and the memory 120. In an embodiment, processing circuit 130 is configured to retrieve and execute the computer executable commands 125 from the memory 120. The computer executable commands 125 includes such as, but not limited to firmware/driver and related commands of the hardware modules such as the power supplying equipment 110 and the memory 120. The processing circuit 130 can execute the computer executable commands 125 to access the signal and data of the power supplying equipment 110 and the memory 120 to perform operation and execute the function of the power supply system 100.

The operation of the power supply system 100 is described in detail in the following paragraphs.

Figure 2:
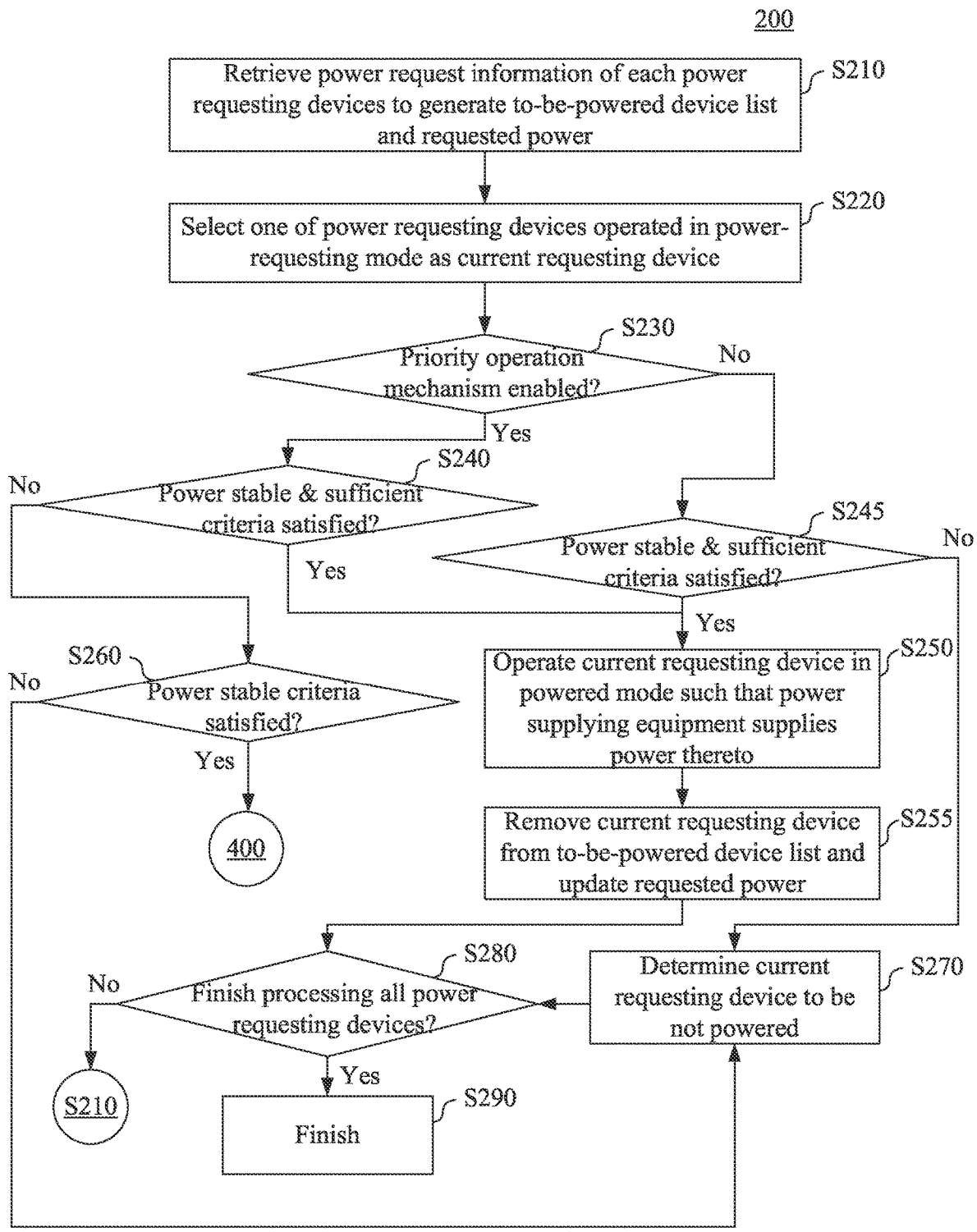
FIG. 2 illustrates a flow chart of a power supply method having power management mechanism according to an embodiment of the present invention.

Reference is now made to FIG. 2. FIG. 2 illustrates a flow chart of a power supply method 200 having power management mechanism according to an embodiment of the present invention. The power supply method 200 can be used in such as, but not limited to the power supply system 100 in FIG. 1. More specifically, the processing circuit 130 is configured to execute the computer executable commands 125 to further execute the power supply method 200. An embodiment of the power supply method 200 is illustrated in FIG. 2 that includes the steps outlined below.

In step S210, power request information $RI_1 \sim RI_M$ of each of the power requesting devices $PD1 \sim PD_M$ coupled to the power supplying equipment 110 is retrieved to generate a to-be-powered device list LI and a requested power UP by the processing circuit 130.

In an embodiment, when the power requesting devices $PD_1 \sim PD_M$ are coupled to the power supplying equipment 110, each of the power requesting devices $PD_1 \sim PD_M$ delivers a power request (not illustrated in the figure) to the power supplying equipment 110 such that the processing circuit 130 receives the power request to retrieve the power request information $RI_1 \sim RI_M$. However, if any one of the power requesting devices $PD_1 \sim PD_M$ does not deliver the power request, the processing circuit 130 does not retrieve the corresponding power request information.

In an embodiment, the power request information $RI_1 \sim RI_M$ includes such as, but not limited to information of an identification code, an individual requested power, a priority or a combination thereof. After the power supply system 100 is initialized to operate, the processing circuit 130 can preserve a time to obtain the information described above.

The identification code can be any information that is able to identify the power requesting devices $PD_1 \sim PD_M$. The individual requested power can be such as, but not limited to a static assigned power of each of the power requesting devices $PD_1 \sim PD_M$, i.e., the maximum required power of each of the power requesting devices $PD_1 \sim PD_M$, which is a fixed value. The priority is generated according to weighted parameters of, such as, but not limited to a device numbering, a user default priority parameter or a combination thereof.

It is appreciated that the content that the power request information $RI_1 \sim RI_M$ includes is merely an example. In other embodiments, the power request information $RI_1 \sim RI_M$ may include different contents according to practical requirements.

When the power request information $RI_1 \sim RI_M$ is retrieved, the processing circuit 130 does not begin to perform power management on the power supply system 100 and does not supply power to the power requesting devices $PD_1 \sim PD_M$ yet. All the power requesting devices $PD_1 \sim PD_M$ are operated in a power-requesting mode.

As a result, the above-described information of all the power requesting devices $PD_1 \sim PD_M$ operated in the power-requesting mode can be included in the to-be-powered device list LI generated by the processing circuit 130. The requested power UP may include such as, but not limited to the individual requested power of each of the power requesting devices $PD_1 \sim PD_M$ and a total requested power.

In step S220, one of the power requesting devices $PD_1 \sim PD_M$ operated in the power-requesting mode is selected as a current requesting device by the processing circuit 130.

In an embodiment, one of the power requesting devices $PD_1 \sim PD_M$ that already delivers the power request is set as the current requesting device by the processing circuit 130 according to an order of the priority of each of the power requesting devices $PD_1 \sim PD_M$.

In step S230, whether a priority operation mechanism is enabled is determined by the processing circuit 130. It is appreciated that the processing circuit 130 determines whether the power requesting devices $PD_1 \sim PD_M$ are powered according to the predetermined priority by determining whether the priority operation mechanism is enabled. In other words, when the priority operation mechanism is not enabled, the processing circuit 130 can power the power requesting devices $PD_1 \sim PD_M$ without following the predetermined priority thereof.

In step S240, when the priority operation mechanism is determined to be enabled, whether the current requesting device simultaneously satisfies a power stable criteria and a power sufficient criteria is determined by the processing circuit 130.

In an embodiment, the current requesting device is determined to satisfy the power stable criteria by the processing circuit 130 when each of the power requesting devices $PD_1 \sim PD_M$ having the priority higher than the priority of the current requesting device operates in a powered mode, or when all the power requesting devices $PD_1 \sim PD_M$ that operate in the powered mode enter a stable operation status.

The powered mode is a mode operated by the power requesting devices when the power requesting devices are already powered by the power supplying equipment 110. The stable operation status in the powered mode is described in the following paragraphs.

In an embodiment, the current requesting device is determined to satisfy the power sufficient criteria by the processing circuit 130 when a stable system remained power of the power supply system 100 is not smaller than the individual requested power of the current requesting device.

Each of the power requesting devices operating in the powered mode has a its power consumption, and the power consumption of all the power requesting devices operating in the powered mode are summed up to be a total power consumption. The stable system remained power is a difference between a system total power that can be supplied by all the power supply units $PSE_1 \sim PSE_N$ of the power supplying equipment 110 and the total power consumption. The power consumption of each of the power requesting devices operated in the powered mode can be calculated depending on whether each of the power requesting devices is operated in a static power management mode or a dynamic power management mode, and whether each of the power requesting devices is operated in a stable operation status or an unstable operation status.

The power requesting device $PD_4$ operated in the powered mode is used as an example to describe the calculation method.

Figure 3:
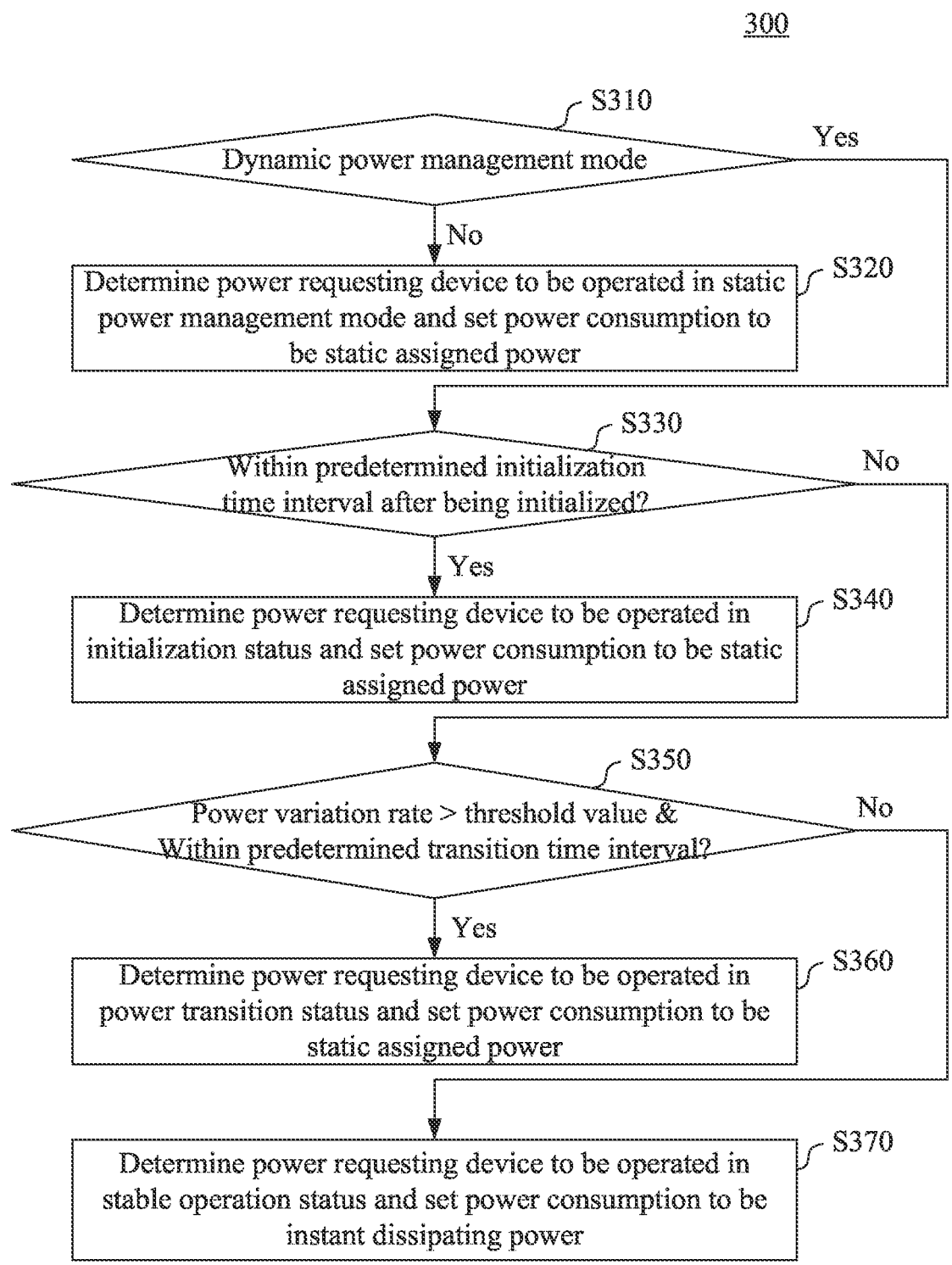
FIG. 3 illustrates a flow chart of a calculation process that calculates the power consumption of the power requesting device operated in the powered mode according to an embodiment of the present invention.

Reference is now made to FIG. 3. FIG. 3 illustrates a flow chart of a calculation process 300 that calculates the power consumption of the power requesting device $PD_4$ operated in the powered mode according to an embodiment of the present invention.

In step S310, whether the power requesting device $PD_4$ is operated in the dynamic power management mode is determined by the processing circuit 130.

In step S320, when the power requesting device $PD_4$ is not operated in the dynamic power management mode, the power requesting device $PD_4$ is determined to be operated in the static power management mode by the processing circuit 130. The power consumption of the power requesting device $PD_4$ is set to be the static assigned power thereof.

In step S330, when the power requesting device $PD_4$ is determined to be operated in the dynamic power management mode, whether the power requesting device $PD_4$ is operated within a predetermined initialization time interval after being initialized is determined by the processing circuit 130. In an embodiment, the length of the predetermined initialization time interval can be such as, but not limited to 100 to 200 milliseconds.

In step S340, when the power requesting device $PD_4$ is determined to be operated within the predetermined initialization time interval after being initialized, the power requesting device $PD_4$ is determined to be operated in an initialization status by the processing circuit 130, in which the initialization status is included in the unstable operation status. Further, the power consumption of the power requesting device $PD_4$ is set to be the static assigned power thereof.

In step S350, when the power requesting device $PD_4$ is determined to be not within the predetermined initialization time interval (i.e., the operation time of the power requesting device $PD_4$ already exceeds the predetermined initialization time interval), whether a power variation rate of the power requesting device $PD_4$ is larger than a predetermined variation threshold value and whether the power requesting device $PD_4$ is operated within a predetermined transition time interval is determined by the processing circuit 130.

In an embodiment, the power variation rate is generated by sampling the power values of the power requesting device $PD_4$ based on a predetermined sampling time interval and calculating a ratio between a power difference and a time length. In different embodiments, the length of the sampling time interval and the amount of the predetermined variation threshold value can be set to have different values depending on practical requirements. For example, the length of the sampling time interval can be a certain hundreds of milliseconds. The amount of the predetermined variation threshold value can be such as but not limited to 10% to 30%.

In step S360, when the power variation rate of the power requesting device $PD_4$ is determined to be larger than the predetermined variation threshold value and when the power requesting device $PD_4$ is determined to be operated within the predetermined transition time interval, the power requesting device $PD_4$ is determined to be operated in a power transition status by the processing circuit 130, in which the power transition status is included in the unstable operation status. Further, the power consumption of the power requesting device $PD_4$ is set to be the static assigned power thereof.

In different embodiments, the length of the predetermined transition time interval can be set to have different values depending on practical requirements.

In step S370, when the power variation rate of the power requesting device $PD_4$ is determined to be not larger than the predetermined variation threshold value and when the power requesting device $PD_4$ is determined to be operated beyond the predetermined transition time interval, the power requesting device $PD_4$ is determined to be operated in a stable operation status by the processing circuit 130. Further, the power consumption of the power requesting device $PD_4$ is set to be an instant power consumption thereof.

The power consumption of each of the other power requesting devices can be calculated based on the above-described flow. The detail thereof is not described herein. As a result, whether the current requesting device simultaneously satisfies the power stable criteria and the power sufficient criteria can be determined by the processing circuit 130 based on the method described above.

Reference is now made back to the flow in FIG. 2. In step S250, when the current requesting device is determined to simultaneously satisfy the power stable criteria and the power sufficient criteria, the current requesting device is operated in the powered mode by the processing circuit 130 such that the power supplying equipment 110 supplies power thereto.

In step S255, the current requesting device is removed from the to-be-powered device list LI and the requested power UP is updated by the processing circuit 130.

In step S260, when the current requesting device is determined to not satisfy one of the power stable criteria and the power sufficient criteria, whether the current requesting device satisfies the power stable criteria is determined by the processing circuit 130.

In step S270, when the current requesting device is determined to not satisfy the power stable criteria, the current requesting device is determined to be not powered by the processing circuit 130. On the other hand, when the current requesting device is determined to satisfy the power stable criteria by the processing circuit 130, the flow goes to execute a powered device removing process 400.

Figure 4:
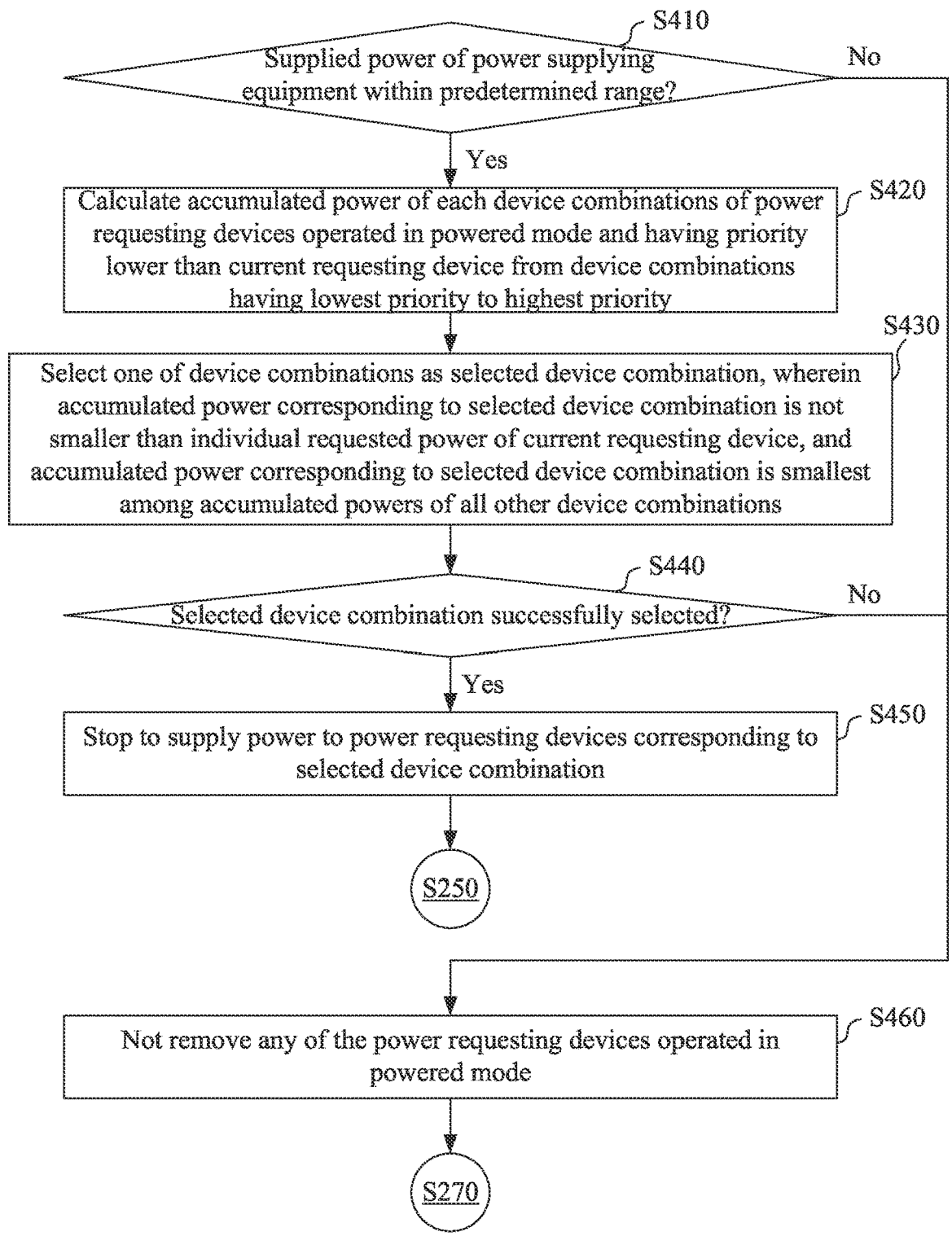
FIG. 4 illustrates a flow chart of a powered device removing process according to an embodiment of the present invention.

Reference is now made to FIG. 4. FIG. 4 illustrates a flow chart of the powered device removing process 400 according to an embodiment of the present invention.

In step S410, whether a supplied power of the power supplying equipment 110 is within a predetermined range by the processing circuit 130. In an embodiment, the predetermined range can be such as a value range that is below and above a certain percentage (e.g., 10%) relative to an output value of a rated supplied power.

In step S420, an accumulated power of each of a plurality of device combinations of the power requesting devices operated in the powered mode and having the priority lower than the current requesting device from the device combinations having the lowest priority to the highest priority is calculated by the processing circuit 130 when the supplied power is within the predetermined range. Each of the device combinations may include one or more than one of the power requesting devices.

In step S430, one of the device combinations is selected as a selected device combination by the processing circuit 130, wherein the accumulated power corresponding to the selected device combination is not smaller than the individual requested power of the current requesting device, and the accumulated power corresponding to the selected device combination is the smallest among the accumulated powers of all the other device combinations.

In step S440, whether the selected device combination is successfully selected is determined by the processing circuit 130.

In step S450, when the selected device combination is successfully selected, the power requesting devices corresponding to the selected device combination is stopped to be supplied power by the processing circuit 130. The flow goes back to step S250 in FIG. 2 such that the current requesting device is operated in the powered mode by the processing circuit 130 and step S255 is subsequently performed to remove the current requesting device from the to-be-powered device list LI and update the requested power UP.

In step S460, when the supplied power of the power supplying equipment 110 is not determined to be not within the predetermined range in step S410 or when the selected device combination is not successfully selected in step S440, any of the power requesting devices operated in powered mode are not removed by the processing circuit 130. The flow goes back to step S270 in FIG. 2 such that the current requesting device is determined to be not powered by the processing circuit 130.

The powered device removing process 400 is further described in detail by using a usage scenario. In such a usage scenario, the number of the power requesting devices is 4 and the priority thereof from the highest to the lowest is in the order of the power requesting devices $PD_1$~$PD_4$ (i.e., the power requesting devices $PD_1$ has the highest priority and the power requesting device $PD_4$ has the lowest priority). The power requesting devices $PD_2$~$PD_4$ are operated in the powered mode and the power consumption thereof is respectively 30 watts, 4 watts and 4 watts. The stable system remained power of the power supplying equipment 110 is 2 watts. The power requesting device $PD_1$ is selected to be the current requesting device and the individual requested power thereof is 15 watts.

Since the priority of the power requesting device $PD_1$ is higher than the priority of each of the power requesting devices PD2~PD4, the accumulated power of each of the device combinations is calculated by the processing circuit 130. The accumulated powers of the device combinations from the lowest value to the highest values are listed below: the accumulated power (4 watts) of only the power requesting device $PD_4$, the accumulated power (4 watts) of only the power requesting device $PD_3$, the accumulated power (8 watts) of the power requesting devices $PD_4$ and $PD_3$, the accumulated power (30 watts) of only the power requesting device $PD_2$, the accumulated power (34 watts) of the power requesting devices $PD_2$ and $PD_4$, the accumulated power (34 watts) of the power requesting devices $PD_2$ and $PD_3$, and the accumulated power (38 watts) of the power requesting devices $PD_2$~$PD_4$.

Based on the above description, the accumulated powers (30 watts, 34 watts, 34 watts and 38 watts) of four of the device combinations are not smaller than the individual requested power (15 watts) of the current requesting device. Only the accumulated power (30 watts) of the device combination that only include the power requesting devices $PD_2$ is smaller than the accumulated powers of the other device combinations. As a result, the device combination that only include the power requesting devices $PD_2$ is selected as the selected device combination. The power requesting devices $PD_2$ corresponding to such a device combination is stopped to be supplied power by the processing circuit 130 such that the power requesting devices $PD_1$ having a higher priority is operated in the powered mode.

Since the power consumption of the power requesting devices PD3~PD4 each having a lower priority are too small (the accumulated power is 8 watts) in the above usage scenario, the requirement of the power requesting devices $PD_1$ (15 watts) cannot be satisfied. As a result, by using the powered device removing process 400 described above, the power requesting devices having the higher priority can be powered and the number of the removed power requesting devices is the least and the number of times of the removing activity is the least. A multiple of redundant removing and rejoining processes generated due to the conventional method that removes the power requesting devices having the low priority first can be avoided.

Reference is now made back to the flow in FIG. 2. In step S245, when the priority operation mechanism is determined to be not enabled, whether the current requesting device simultaneously satisfies a power stable criteria and a power sufficient criteria is determined by the processing circuit 130. The method to determine whether the power stable criteria and the power sufficient criteria are satisfied is already described in the previous paragraphs and is not described herein.

When the current requesting device simultaneously satisfies the power stable criteria and the power sufficient criteria, the flow also proceeds to step S250 and step S255 such that the current requesting device is operated in the powered mode so that the power supplying equipment 110 supplies power thereto, the current requesting device is removed from the to-be-powered device list LI and the requested power UP is updated by the processing circuit 130.

When the current requesting device does not satisfy one of the power stable criteria and the power sufficient criteria, the flow directly goes to step S270 such that the current requesting device is determined to be not powered by the processing circuit 130 since the priority is not taken into consideration.

In step S280, after either step S255 or step S270, whether all the power requesting devices are finished to be processed is determined by the processing circuit 130. When not all the power requesting devices are finished to be processed is determined by the processing circuit 130, the flow goes back to step S210 to update the to-be-powered device list LI and the requested power UP so as to select a next one of the power requesting devices operated in the power-requesting mode as the current requesting device to proceed the flow.

In step S290, when all the power requesting devices are finished to be processed is determined by the processing circuit 130, the flow is finished. Under such a condition, the to-be-powered device list LI does not include any of the power requesting devices operated in the power-requesting mode and the requested power UP becomes 0. However, it is appreciated that when a new power requesting device is coupled to the power supplying equipment 110, the flow starts over from step S210.

It is appreciated that the embodiments described above are merely an example. In other embodiments, it should be appreciated that many modifications and changes may be made by those of ordinary skill in the art without departing, from the spirit of the invention.

In some technologies, the power supply system performs power management solely based on the priority of each of the power requesting devices. Under such a condition, the power requesting devices having a high priority always occupy more resource while the power requesting devices having a lower priority has to be powered later or are not able to obtain resource.

On the contrary, the power supply system and the power supply method having power management mechanism of the present invention allows the current requesting device having a lower priority to be powered while the power requesting devices operated in the powered mode are kept to be stable. The order of supplying power is not fully determined according to the priority. Further, when the power requesting devices are required to be removed, the power requesting devices can be removed based on the power consumption thereof. The order of removing the power requesting devices is not fully determined according to the priority. Such a method can provide the system an elastic power management method.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A power supply method having power management mechanism used in a power supply system, comprising:
  retrieving power request information of each of a plurality of power requesting devices coupled to a power supplying equipment to generate a to-be-powered device list and a requested power;
  selecting one of the power requesting devices operated in a power-requesting mode as a current requesting device;
  determining that all the power requesting devices that operate in a powered mode enter a stable operation status to determine that the current requesting device satisfies a power stable criteria, wherein for the power requesting devices operating in the powered mode, the power requesting devices are determined to be operated in the stable operation status when the power requesting devices have a power variation rate not larger than a predetermined variation threshold value or an operation time of the power requesting devices exceeds a predetermined transition time interval, in which the predetermined transition time interval is after an predetermined initialization time interval that is after the power requesting devices being initialized;
  determining that a stable system remained power of the power supply system is not smaller than an individual requested power of the current requesting device to determine that the current requesting device satisfies a power sufficient criteria, wherein each of the power requesting devices operating in the powered mode has a power consumption, the power consumption of all the power requesting devices operating in the powered mode are summed up to be a total power consumption, and the stable system remained power is a difference between a system total power of the power supplying equipment and the total power consumption, and the power consumption of each of the power requesting devices is determined by:
  setting the power consumption of each of the power requesting devices operating in a static power management mode to be a static assigned power thereof;
  setting the power consumption of each of the power requesting devices operating in a dynamic power management mode and operating in an unstable operation status to be the static assigned power thereof; and
  setting the power consumption of each of the power requesting devices operating in the dynamic power management mode and operating in the stable operation status to be an instant power consumption thereof;
  operating the current requesting device, having both of the criteria satisfied, in the powered mode such that the power supplying equipment supplies power to the current requesting device; and
  removing the current requesting device in the powered mode from the to-be-powered device list and updating the requested power.

2. The power supply method of claim 1, wherein for the power requesting devices operating in the powered mode, the power supply method further comprises:
  determining that the power requesting devices are operated in an initialization status when the power requesting devices are operated within the predetermined initialization time interval after being initialized, wherein the unstable operation status comprises the initialization status; and
  after the predetermined initialization time interval, determining that the power requesting devices are operated in a power transition status when the power requesting devices have the power variation rate larger than the predetermined variation threshold value in the predetermined transition time interval, wherein the unstable operation status comprises the power transition status.

3. The power supply method of claim 1,
  wherein the current requesting device is not powered when a priority operation mechanism is not enabled and when the current requesting device does not satisfy one of the power stable criteria and the power sufficient criteria;
  wherein the current requesting device is not powered when the priority operation mechanism is enabled and when the current requesting device does not satisfy both of the power stable criteria and the power sufficient criteria; and
  wherein a powered device removing process is performed when the priority operation mechanism is enabled and when the current requesting device satisfies the power stable criteria and does not satisfy the power sufficient criteria.

4. The power supply method of claim 3, wherein for the power requesting devices operating in the powered mode, the powered device removing process further comprises:
  determining whether a supplied power of the power supplying equipment is within a predetermined range;
  calculating an accumulated power of each of a plurality of device combinations of the power requesting devices having a priority lower than the current requesting device from the device combinations having the lowest priority to the highest priority when the supplied power is within the predetermined range;

selecting one of the device combinations as a selected device combination, wherein the accumulated power corresponding to the selected device combination is not smaller than the individual requested power of the current requesting device, and the accumulated power corresponding to the selected device combination is the smallest among the accumulated powers of all the other device combinations;

stopping to supply power to the power requesting devices corresponding to the selected device combination when the selected device combination is successfully selected;

operating the current requesting device in the powered mode;

removing the current requesting device from the to-be-powered device list, and updating the requested power; and not removing any of the power requesting devices in the powered mode when the supplied power is not within the predetermined range or when the selected device combination is not successfully selected.

5. The power supply method of claim 1, wherein the priority is generated according to a device numbering, a user default priority parameter or a combination thereof.

6. The power supply method of claim 1, further comprising:

setting one of the power requesting devices that already delivers a power request as the current requesting device according to an order of the priority of each of the power requesting devices.

7. The power supply method of claim 1, wherein the power supplying equipment supplies power to the power requesting devices according to a Power over Ethernet (POE) technology.

8. A power supply system having power management mechanism, comprising:

a power supplying equipment;

a memory configured to store computer executable commands; and a processing circuit electrically coupled to the power supplying equipment and the memory and configured to retrieve the computer executable commands from the memory to execute a power supply method, wherein the power supply method comprises:

retrieving power request information of each of a plurality of power requesting devices coupled to a power supplying equipment to generate a to-be-powered device list and a requested power;

selecting one of the power requesting devices operated in a power-requesting mode as a current requesting device;

determining that all the power requesting devices that operate in the powered mode enter a stable operation status to determine that the current requesting device satisfies a power stable criteria, wherein for the power requesting devices operating in the powered mode, the power requesting devices are determined to be operated in the stable operation status when the power requesting devices have a power variation rate not larger than a predetermined variation threshold value or an operation time of the power requesting devices exceeds a predetermined transition time interval, in which the predetermined transition time interval is after an predetermined initialization time interval that is after the power requesting devices being initialized;

determining that a stable system remained power of the power supply system is not smaller than an individual requested power of the current requesting device to determine that the current requesting device satisfies a power sufficient criteria, wherein each of the power requesting devices operating in the powered mode has a power consumption, the power consumption of all the power requesting devices operating in the powered mode are summed up to be a total power consumption, and the stable system remained power is a difference between a system total power of the power supplying equipment and the total power consumption, and the power consumption of each of the power requesting devices is determined by:

setting the power consumption of each of the power requesting devices operating in a static power management mode to be a static assigned power thereof;

setting the power consumption of each of the power requesting devices operating in a dynamic power management mode and operating in an unstable operation status to be the static assigned power thereof; and setting the power consumption of each of the power requesting devices operating in the dynamic power management mode and operating in the stable operation status to be an instant power consumption thereof;

operating the current requesting device, having both of the criteria satisfied, in the powered mode when both of the criteria are satisfied such that the power supplying equipment supplies power to the current requesting device; and removing the current requesting device in the powered mode from the to-be-powered device list and updating the requested power.

9. The power supply system of claim 8, wherein the power supplying equipment comprises at least one power supply unit, and the processing circuit and the memory are either disposed in the power supplying equipment or outside of the power supplying equipment.

10. The power supply system of claim 8, wherein for the power requesting devices operating in the powered mode, the power supply method further comprises:

determining that the power requesting devices are operated in an initialization status when the power requesting devices are operated within the predetermined initialization time interval after being initialized, wherein the unstable operation status comprises the initialization status; and after the predetermined initialization time interval, determining that the power requesting devices are operated in a power transition status when the power requesting devices have the power variation rate larger than the predetermined variation threshold value in a predetermined transition time interval, wherein the unstable operation status comprises the power transition status.

11. The power supply system of claim 8, wherein the power supply method further comprising:

wherein the current requesting device is not powered when a priority operation mechanism is not enabled and when the current requesting device does not satisfy one of the power stable criteria and the power sufficient criteria;

wherein the current requesting device is not powered when the priority operation mechanism is enabled and when the current requesting device does not satisfy both of the power stable criteria and the power sufficient criteria; and wherein a powered device removing process is performed when the priority operation mechanism is enabled and when the current requesting device satisfies the power stable criteria and does not satisfy the power sufficient criteria.

12. The power supply system of claim 11, wherein for the power requesting devices operating in the powered mode, the powered device removing process further comprises:

determining whether a supplied power of the power supplying equipment is within a predetermined range;

calculating an accumulated power of each of a plurality of device combinations of the power requesting devices having a priority lower than the current requesting device from the device combinations having the lowest priority to the highest priority when the supplied power is within the predetermined range;

selecting one of the device combinations as a selected device combination, wherein the accumulated power corresponding to the selected device combination is not smaller than the individual requested power of the current requesting device, and the accumulated power corresponding to the selected device combination is the smallest among the accumulated powers of all the other device combinations;

stopping to supply power to the power requesting devices corresponding to the selected device combination when the selected device combination is successfully selected;

operating the current requesting device in the powered mode;

removing the current requesting device from the to-be-powered device list, and updating the requested power; and not removing any of the power requesting devices in the powered mode when the supplied power is not within the predetermined range or when the selected device combination is not successfully selected.

13. The power supply system of claim 8, wherein the priority is generated according to a device numbering, a user default priority parameter or a combination thereof.

14. The power supply system of claim 8, wherein the power supply method further comprises:

setting one of the power requesting devices that already delivers a power request as the current requesting device according to an order of the priority of each of the power requesting devices.

15. The power supply system of claim 8, wherein the power supplying equipment supplies power to the power requesting devices according to a Power over Ethernet (POE) technology.

* * * * *